United States Patent
West et al.

(10) Patent No.: US 9,297,922 B2
(45) Date of Patent: Mar. 29, 2016

(54) BUCKING CIRCUIT FOR ANNULLING A MAGNETIC FIELD

(71) Applicant: VALE S.A., Centro, Rio de Janeiro (BR)

(72) Inventors: Gordon Fox West, Toronto (CA); Peter Whyte Walker, Mississauga (CA); Benjamin David Polzer, Sudbury (CA)

(73) Assignee: VALE S.A., Rio de Janeiro (BR)

(*) Notice: Subject to any disclaimer, the term of this patent is extended or adjusted under 35 U.S.C. 154(b) by 291 days.

(21) Appl. No.: 13/868,803

(22) Filed: Apr. 23, 2013

(65) Prior Publication Data

US 2014/0285206 A1    Sep. 25, 2014

Related U.S. Application Data

(60) Provisional application No. 61/804,080, filed on Mar. 21, 2013.

(51) Int. Cl.
| | |
|---|---|
| *G01V 3/28* | (2006.01) |
| *G01V 3/10* | (2006.01) |
| *G01V 3/165* | (2006.01) |
| *G01V 3/38* | (2006.01) |
| *G01V 3/30* | (2006.01) |
| *G01V 3/18* | (2006.01) |
| *G01V 3/26* | (2006.01) |

(52) U.S. Cl.
CPC ........ *G01V 3/28* (2013.01); *G01V 3/107* (2013.01); *G01V 3/165* (2013.01); *G01V 3/18* (2013.01); *G01V 3/26* (2013.01); *G01V 3/30* (2013.01); *G01V 3/38* (2013.01)

(58) Field of Classification Search
CPC ............. G01V 3/38; G01V 3/30; G01V 3/18; G01V 3/26
USPC ................................................. 324/333
See application file for complete search history.

(56) References Cited

U.S. PATENT DOCUMENTS

| | | | | |
|---|---|---|---|---|
| 3,169,207 | A * | 2/1965 | Barbin et al. | 315/398 |
| 5,552,979 | A * | 9/1996 | Gu et al. | 363/98 |
| 5,781,436 | A * | 7/1998 | Forgang et al. | 702/7 |
| 5,814,988 | A * | 9/1998 | Itskovich et al. | 324/303 |
| 6,044,325 | A * | 3/2000 | Chakravarthy et al. | 702/7 |
| 7,733,077 | B1 * | 6/2010 | Merewether et al. | 324/67 |
| 8,710,846 | B2 * | 4/2014 | Simon et al. | 324/367 |
| 2005/0083161 | A1 * | 4/2005 | Minerbo et al. | 336/132 |
| 2005/0093547 | A1 * | 5/2005 | Xiao et al. | 324/339 |
| 2005/0127917 | A1 * | 6/2005 | Barber | 324/338 |
| 2006/0192561 | A1 * | 8/2006 | Chesser et al. | 324/339 |
| 2010/0052685 | A1 * | 3/2010 | Kuzmin et al. | 324/331 |
| 2011/0001480 | A1 * | 1/2011 | Kuzmin et al. | 324/330 |

* cited by examiner

*Primary Examiner* — Jermele M Hollington
*Assistant Examiner* — Christopher McAndrew
(74) *Attorney, Agent, or Firm* — Arent Fox LLP

(57) ABSTRACT

A method and apparatus is provided for bucking a magnetic field of known geometry and time variation by means of a plurality of bucking loops. It utilizes multiple loops, each of which is energized by an electric current that creates a magnetic field of the known time variation. The multi-loop field forms a bucking magnetic field that better opposes the spatial variation in the known magnetic field over a volume than can the magnetic field from a single loop. The present invention is useful in electromagnetic measurements, where the magnetic field of a controlled source transmitter must be annulled at a magnetic field sensor. It is particularly useful for cases where the magnetic sensor may move relative to the transmitter, such as in certain airborne electromagnetic measurements.

19 Claims, 16 Drawing Sheets

BUCKING CIRCUIT FOR ANNULLING A MAGNETIC FIELD

CROSS REFERENCE TO RELATED APPLICATION

This application is based upon and claims the benefit of priority of the U.S. Patent Application No. 61/804,080, filed Mar. 21, 2013, the disclosure of the prior application is hereby incorporated in its entirety by reference.

BACKGROUND OF THE INVENTION

1. Field of the invention

Aspects of this invention relate generally to bucking systems and to methods of substantially cancelling a magnetic field at points within a volume. More particularly, aspects of this invention may be used in electromagnetic prospecting to cancel the effect of a large transmitted field on a magnetic field sensor without appreciably modifying the interaction of the transmitted field with the ground. The current invention facilitates such cancellation when the sensor is displaced relative to the transmitter.

2. Description of the Related Art

Electromagnetic ("EM") exploration methods comprise an important part of the geophysical methods used to map the Earth in the search of oil, gas and mineral deposits, aquifers and other geological features. EM methods can broadly categorized into two categories, passive source methods in which an electromagnetic survey apparatus is used to map naturally occurring time-variations of the electromagnetic fields over the surface of the Earth, and active source methods, in which the electromagnetic field is emitted from a transmitter that is an integral part of the survey apparatus.

Active source EM systems comprise several parts; a transmitter and antenna to create an electromagnetic field, a sensor and a receiver to detect the signal from the transmitter, and related electronics, mechanical elements, data recorder and a power source. Although EM systems also comprise passive systems in which the natural variation of the electromagnetic field is measured absent a transmitter, in the following discussion, EM systems shall be understood to comprise only those systems with a transmitter unless otherwise noted.

Active source EM systems operate by supplying a time varying current waveform to a transmitter coil, or loop, which creates a corresponding "primary" time varying magnetic field. Time variations in the primary field then induce eddy currents in the Earth, resulting in "scattered" magnetic fields. The scattered fields, together with the primary field, are measured with a receiver, usually by employing a coil, loop or magnetometer sensor. Characteristics of the scattered magnetic field may then be used to determine the electrical properties of the ground. These properties may then be used as a basis for geological interpretation such as inferring the presence of geological features. For example, the characteristic of the scattered field that is in-phase with the primary field may be of interest for detecting highly conductive ores. Improving the characterization of the scattered magnetic field leads to improved geological inferences and hence to the success of any prospecting venture employing an active source system.

In the following, "coil" and "loop" may be used to mean the antenna through which the primary field is emitted, and either may comprise one or more windings (turns) of electrical conductor. The resulting magnetic fields are then detected with a receiver that includes one or more magnetic field sensors. A magnetic field sensor may be a coil, loop or circuit element in which changes in the magnetic flux density are detected in accordance with Faraday's Law, or it may be a magnetometer. Examples of magnetometers include devices that employ fluxgate, feed-back coil, Hall effect, and optically pumped atomic vapor principles for detecting the magnetic field, as well as related instruments.

Loops and coils may comprise circular, elliptical, oval, helical or other similar rounded shapes, or sections thereof, and may comprise linear segments which together form a closed shape, usually with internal angles of less than 180 degrees, examples of which are rectangles, hexagons, octagons, dodecagons and so forth. Loops comprise at least one conductive winding, generally composed of an electrically conductive substance such as copper or aluminum, but may comprise a superconductor. Loops fashioned as convex symmetric polygonal shapes with a plurality of sides may be considered to be substantially circular, as would a circular loop.

When an EM system is deployed in the air, one of two configurations are usually employed. In the first configuration, the transmitter and the receiver may be located on the same platform, structure or "carrier", while in the second configuration, the receiver may be towed at some distance behind the transmitter. In the first configuration, the transmitter and the receiver may be mounted on an aircraft "carrier", examples of which include the system once operated by the Geological Survey of Finland and the Hawk system built by Geotech Ltd. It is also possible to mount the transmitter and receiver on a platform or chassis "carrier" which is towed from the aircraft. Such carriers are generally towed beneath helicopters, and are often referred to as "birds", "sondes" or "bombs". In such cases, the bird may be typically towed 30 to 60 meters below the helicopter at altitudes of about 30 to 60 meters above the ground. In such systems, because the transmitter and receiver are located in close proximity, the primary field at the receiver may be orders of magnitude larger than the scattered field.

When the primary field is much larger than the scattered field, a means of primary-scattered field separation is required to permit accurate detection of the much smaller scattered field. One common method of accomplishing this is by time separation, whereby the primary field is broadcast as a series of shaped pulses with alternating polarity, with each pulse separated by an off-time during which no current flows in the transmitter loop. If the scattered fields are measured during this off-time, the primary field will not be present and highly sensitive measurements of the scattered field are possible. The disadvantage of limiting measurement to the off-time is a loss of information. In particular, the in-phase component of scattered response may be poorly rendered, with the result that certain highly conductive ores may be undetectable. Since highly conductive ores are often targeted in airborne electromagnetic ("AEM") surveys, accurate on-time measurements may be quite important to the success of AEM ventures. It is therefore advantageous to acquire good quality in-phase AEM data.

A number of AEM systems have used off-time measurements as a means of separating the scattered field from the primary field. Most notable of these was the Barringer Input system and the systems derived from it such as Geotem, Megatem and Questem.

Bucking provides an alternative means of primary-scattered field separation. When the in-phase component of the primary field is large, such as when the transmitter and the receiver are located in close proximity, a bucking loop may be used either to directly cancel the primary field at the receiver through active bucking, or to cancel its effect on the receiver through passive bucking. Active bucking involves the creation of a bucking magnetic field that will substantially cancel the primary field seen by the magnetic field sensor of the EM system. Usually the bucking magnetic field is created by passing the time varying current waveform used to energize the transmitter loop or antenna through a second smaller loop that is near the magnetic field sensor. In passive bucking, an additional magnetic field sensor is used to detect a different combination of primary and scattered fields than is seen by a single magnetic field sensor. The signals from the two sensors are then combined in a way to annul the primary field in the combined signal. Bucking may therefore be used advantageously to acquire good quality in-phase AEM data in the presence of a large primary field.

An additional advantage to bucking results as a consequence of suppressing the primary field in the presence of the receiver. When the primary field is bucked, the receiver may be operated with higher sensitivity than were the field to be unbucked. More subtle scattered field anomalies may therefore be detected, so permitting the detection of smaller geological features with weaker physical property contrasts without saturating the receiver.

Examples of systems using bucking are the Dighem helicopter frequency domain system which employs passive bucking, as did a proposed system by Whitton (US patent application 2003169045A1); and the VTEM (US patent application 2011/0148421 A1) and the Aerotem helicopter time domain systems that employ active bucking.

In systems employing active bucking, the objective is to annul the primary field at the receiver without appreciably affecting the eddy current induction caused by the transmitter in the Earth. Accordingly, the bucking loop is chosen to be geometrically smaller than the transmitter loop but closer to the sensor. As a result, the range of receiver positions over which the field may be bucked is usually also small. Because of this, any relative displacement of the magnetic field sensor with respect to those loops may strongly affect the degree to which the primary field is cancelled at the sensor. Accordingly, in the current state of the art, the quality of the bucking improves as the system becomes increasingly rigid.

An advantage of active bucking is that the primary field in the vicinity of the receiver is suppressed, despite the fact that the field is not perfectly cancelled at all nearby locations. In so doing, eddy current induction due to changes in the primary field within any metallic components of the receiver and its chassis is strongly reduced.

In the current state of the art, bucking has been most effective when the relative geometries of the transmitter loop, the magnetic field sensor and the bucking loop are nearly rigidly fixed. Whenever the loop geometries change either in shape or in position relative to one another, unbucked residuals of the primary field will appear as signals in the receiver. The residuals are generally indistinguishable from the in-phase scattered field, and so may degrade the quality of the measured scattered response. The AEROTEM and Dighem systems employ a nearly rigid geometry, and so minimize the variation in unbucked primary field residuals caused by loop motion. Nevertheless, some unbucked residuals may occur, even in a system with a nominally nearly rigid geometry. These residuals may result from small changes in loop geometry, often attributed to thermal expansion, producing a phenomenon known as "drift".

Despite the advantages of a rigid geometry for accurate bucking, and so for measuring the in-phase component of the scattered field accurately, it may be necessary or advantageous to permit some variation in the relative geometry of the transmitter loop, the magnetic field sensor, and the bucking loop. The VTEM system is illustrative of an AEM system that is substantially rigid in the EM acquisition band, yet has a flexible geometry. The light weight of its transmitter chassis permits a larger transmitter loop and therefore moment than would be possible were the system to be nearly rigid. Because the transmitter loop is deformable, it can be handled with greater ease during lift-off and set-down stages of each flight. Construction of the loop chassis in sections facilitates transportation and breakage is easier to repair: Collisions do not involve the catastrophic loss of a single rigid chassis with its high-value components. The trade-off introduced as a result of increased flexibility is that the fidelity of the bucking is less than could be provided by a comparable nearly rigid system.

Polzer et al (international patent application WO 2011/085462 A1) has noted a second advantage to allowing some flexibility in the geometry of the transmitter loop, the magnetic field sensor and the bucking loop. Polzer noted that the rotation of an EM sensor in the background magnetic field of the Earth, particularly in the 1-25 Hz low frequency range, creates noise which had previously prevented the acquisition of high-precision airborne electromagnetic data in that band. By employing a stabilization system for motion isolation in which the magnetic field sensor moves relative to the bird in which is housed, high-precision airborne electromagnetic data in the 1-25 Hz band may be acquired. In so doing, the geometry of the AEM system must be flexible.

Thus, in the current state of the art in AEM surveying, single loops are used to buck the primary field. Nearly rigid systems provide relatively stable bucking and permit precise in-phase measurements of the scattered field, sacrificing transmitter moment, light weight and certain logistical advantages. Flexible systems permit a larger transmitter moment and logistical advantages, but with less perfect bucking, and less accurate measurement of the in-phase component of the scattered field as a consequence. Less accurate in-phase measurements may result in poorer resolution of highly conductive geological features, many of which are targets of EM surveys commissioned for mining exploration. Less perfect bucking could also mean that larger magnetic field amplitude variations may be encountered than in the case of a well bucked system, and that as a consequence, EM data may be acquired with lower resolution.

Bucking coils are not necessarily used with the intention of annulling the field of a transmitter. For example, US Patent application 2011227578 A1 to Hall et al describes an induction logging tool which uses multiple bucking coils to redirect the field produced by the transmitter at any angle from the rotational axis of the logging tool.

Miles et al, in U.S. Pat. No. 7,646,201 B2, disclosed an AEM system having a rigid transmitter loop concentric with an inner and an outer receiver loop. By null coupling the receiver loop to the transmitter, the receiver loop could be made mainly sensitive to scattered field of the Earth generated within the annulus defined by the receiver loop.

Kuzmin et at (Patent application US 2010/0052685) disclose an active bucking system for the VTEM AEM system which has a flexible geometry. The system consists of an outer transmitter loop and an inner, coplanar and concentric bucking loop, both of which are centered on a receiver loop. The bucking loop and the transmitter loop are connected in series so that the primary field at the receiver is approximately annulled. However, flexure in the loop geometry causes shifts in the measured fields resulting from unbucked residuals of the primary field at the sensor. In the case of systems such as Kuzmin's where the transmitter and bucking loops are approximately concentric around the magnetic field sensor, the axial magnetic field, $H_z$, though the center of each loop may be computed, to good approximation, from:

$$H_z(z) = i / \{2*a*(1+(z/a)^2)^{3/2}\}$$

where i is the current in the loop, a is the radius of the loop and z is the offset on the axis through the loop.

It would be advantageous, in the case of AEM systems, if the bucking apparatus could be designed so as to accommodate relative motions of the transmitter loop, magnetic field sensor and bucking loops so as to retain the advantages of system flexibility as is in the case of the VTEM system while improving the bucking within a volume defined by the motion of the magnetic field sensor relative to the transmitter and bucking loops. Such a bucking apparatus would be advantageous in flexible EM systems, and would improve bucking in AEM systems employing motion isolation, as in the case of Polzer's system. A first advantage of such a bucking apparatus would be in yielding improved in-phase EM data, and so improved sensitivity to highly conductive ores. A second advantage would be in yielding data which may be acquired with improved resolution, resulting in greater sensitivity to subtle features in the scattered electromagnetic field.

DESCRIPTION OF THE INVENTION

The present invention improves the quality of the bucked primary field over the current state-of the-art single loop bucking where a magnetic field sensor may vary its location within a defined volume located relative to the transmitter loop. The present invention may also improve the quality of the bucked primary field where the position of a transmitter loop, or parts of it, may vary in relation to a bucking loop.

The present invention uses a plurality of coils or loops which are energized with electrical current to create a "bucking field" which substantially opposes the primary field on the magnetic field sensor. By employing a plurality of loops, substantial cancellation of the primary field may be effected over a larger volume than may be accomplished with a single loop. In so doing, the bucked field is less sensitive to changes in the system geometry than when a single bucking coil is used.

By using a plurality of loops in a "bucking loop arrangement", the geometrical variation of the primary field at the sensor may be approximately matched (and opposed) over a larger volume than is possible with a single loop. Since the loops used to buck the primary field are not geometrically identical to the transmitter loop, the range of volume over which the field is bucked, and the degree to which the primary field is cancelled, will depend on the particular application to which the present invention is being applied. The purpose of the present invention is not to identically cancel the primary field at all points in a volume of interest, but to substantially oppose the primary field on the magnetic field sensor over a certain volume in comparison to what may be accomplished with a single bucking loop.

As a matter of definition, the words "cancel" and "nulling" and "annulling", and variations thereon, refer to the effect of substantially diminishing the primary magnetic field of a transmitter loop over a volume of interest. The specific amount of cancellation, and the volume over which the cancellation is to occur, is understood to be determined by the requirements of the specific method or apparatus that may utilize the present invention.

It is noted that in the case where bucking loops substantially cancel a magnetic field along an axis, the cancellation extends radially from that axis as a result of the divergence free property of the magnetic field if it is not of very high frequency. Thus, where substantial cancellation occurs along such a nulling axis, the existence of such a "nulling axis" implies substantial cancellation within a volume comprising said nulling axis. As a matter of definition, such a volume comprising a nulling axis is defined to be a "bucked volume".

In the present invention, a set of multiple loops creates a bucking field which oppositely matches the shape of the primary field, namely its amplitude, polarity, time and spatial variation, over a substantially fixed volume in space relative to the transmitter antenna. Bucking will be more effective for a given number of loops when the variation of the primary field over the bucked volume is small.

By so matching the effect of the bucking loops to the effect of the transmitter along a nulling axis, rather than at a point as in the case of a single loop, substantial cancellation may be obtained as the magnetic field sensor moves with respect to the transmitter within a bucked volume substantially centered on such a nulling axis.

Small changes in the transmitter loop geometry may cause small shifts in the space occupied by the bucked volume. Provided the geometry of transmitter loop is substantially rigid, such that these shifts are small, a magnetic field sensor with a limited range of motion will remain within the bucked volume. In airborne electromagnetic surveying, for example, substantial rigidity may be supplied either by composite structural members which support the loops, or by combinations of such structural members and cables, either of which may be used as a supporting framework in the current state of the art, while structures which are nearly rigid are generally constructed as shells from composite materials.

A nearly rigid structure has less flexibility than a substantially rigid structure, and references to substantially rigid structures herein are understood to include structures which are nearly rigid.

The present invention may therefore be used to improve the quality of the bucked primary field in cases where the geometry of the magnetic field sensor or the transmitter loop varies in relation to the location of the bucking loops in comparison to that which may be attained using a single bucking loop.

The degree of cancellation and the size of the bucked volume over which bucking may be achieved depends on the number of loops used to oppose the primary field. For example, bucking loops may be configured to match gradients in the primary field, and for to match the curvature in the primary field, and so forth in analogy to a Taylor series. Bucking loops may take the form of superpositions of the aforementioned loop sets, depending on the desired amount of primary field cancellation and the volume over which the field is to be cancelled. The loops may be aggregated to have the same effect as the aforementioned Taylor series without being configured to simulate the individual terms of that series.

To achieve satisfactory bucking over a bucked volume, the selection of the effective bucking loop parameters must be chosen carefully in order to provide a satisfactory result in which the primary field will be suitably cancelled. Each bucking loop will have a number of turns, an effective radius and a current which, when aggregated, will form a bucking magnetic field with a particular geometrical variation. By selecting the turns, radius and current parameters carefully, a bucking circuit arrangement may be designed to substantially annul the primary magnetic field over a particular volume. Where the bucking and transmitter loops are arranged in series, current is not a free parameter in the bucking design and suitable combinations of turns and radii must be carefully selected.

The plurality of bucking loops are mounted on a bucking loop support. Better cancellation is achieved as the bucking loop support becomes more rigid, and by ensuring this support is stably located with respect to the geometrical aspects of the primary field. The transmitter loop and bucking loops may be nearly, or substantially, rigidly joined together, while permitting the magnetic field sensor to move within the bucked volume.

The present invention may achieve effective cancellation over the bucked volume by employing several configurations. For example, a bucking loop may be configured to buck a primary field in a number of ways, including:
  a) direct series connection with the transmitter circuit,
  b) inductive connection with the transmitter circuit, such as with a transformer,
  c) as a circuit electrically independent of any transmitter circuit, apart from a digital or analogue control signal, which may link the two.

In cases where the bucking loops are in a series connection with the transmitter loop, ignoring capacitive effects, the current in each turn of the bucking loops will be substantially the same as the current in the turns of the transmitter loop. Where the loops are connected in a series connection, capacitances may cause high frequency (or rapidly changing) components of the currents in some bucking loops to differ from that in the transmitter loop current, affecting the degree to which the primary field can be effectively annulled.

In the field of airborne electromagnetic surveying, the AEM system often comprises a large substantially circular transmitter loop with a magnetic field sensor located in the plane of the loop. In such cases, it may be advantageous to annul the primary field throughout a volume around the nominal location of the sensor. In systems where the magnetic field sensor is located in the center of the transmitter loop, the bucking loop arrangement may comprise two substantially circular bucking loops, with the bucking loops arranged coaxially in the plane of the transmitter loop, referred herein to as a "coplanar" configuration. In such a two bucking loop coplanar configuration, the radius the inner bucking loop is smaller than the radius of the outer bucking loop and the radius of the outer bucking loop is smaller than the radius of the transmitter loop. Furthermore, the sense of the magnetic moment of the inner loop will be parallel to the magnetic moment of the transmitter loop, while the magnetic moments of the inner and outer bucking loops will be in opposition.

In a second example of a bucking circuit arrangement, referred to herein as a "pseudo-Helmholtz" arrangement, the plurality of loops may comprise at least one set of substantially circular bucking loops arranged coaxially to a substantially circular transmitter loop, but in planes offset in opposite directions from the plane of the transmitter loop, and such that the radius of the bucking loops is smaller than the radius of the transmitter loop. In the coaxial configuration, the sense of the magnetic moment of the bucking loops will be in opposition to the magnetic moment of the transmitter loop.

In both the above cases, the nominal receiver location is at the center of the transmitter loop, and the transmitter loop generates a field on the loop axis that has a vanishing axial gradient in intensity. The pair of bucking loops are therefore configured to cancel both the axial field and the axial curvature of the transmitter loop near the loop center. Where this is not the case, the second bucking loop may be configured with the first to cancel the field and its gradient, or three bucking coils may be employed to cancel the field and its gradient and its curvature.

The present invention has application to the field of airborne electromagnetic surveying in which a small field scattered from the Earth is measured in the presence of a large primary field. In the current state of the art, single bucking loops are employed to annul the primary field at a receiver. However, as larger transmitter moments and more precise and lower frequency scattered field measurements become feasible, improved means of measuring the scattered field in the presence of a large field which accommodates a varying transmitter-receiver geometry are required. In particular, an important aspect of acquiring scattered field measurements at sub 25-Hz frequencies is in permitting a flexible transmitter-receiver geometry, as elucidated in patent WO 2011/085462 A1 to Polzer.

The present invention may also advantageously improve scattered field measurements where a flexible transmitter-receiver geometry is present by increasing the effective volume over which the primary field may be annulled, and there are a number of ways the present invention may be advantageously employed to this effect. As one example, where a motion isolation system is employed to permit acquisition of sub-25 Hz electromagnetic data, the transmitter loop and a plurality of bucking loops may be joined together, where the bucking loops are connected to a housing containing a motion isolation system in which a magnetic field sensor is mounted. This aspect of the invention has the advantage of permitting the receiver to move independently of its chassis, but within the bucked zone of the primary field, and so is suitable for use in motion isolation devices such as the one disclosed in patent WO 2011/085462 A1. Another advantage of the present invention is that eddy current induction due to the primary field in a volume surrounding the receiver is suppressed in comparison to that of a single bucking loop, so decreasing system noise. The present invention may be also advantageously employed in flexible-geometry EM systems, such as may be exemplified by the VTEM system, where the receiver and its bucking loop may be mounted at the center of a substantially circular, flexible transmitter loop, whereby additional bucking loops would diminish the variability of the bucked field due to the relative motions and flexure in the loops, and a plurality of bucking loops may lie in the same plane as the transmitter loop. In such a flexible system, variation in the bucked field may be reduced by adding one or more additional bucking loops to the plane of the transmitter.

The foregoing examples have illustrated various possible uses of the present invention systems with a flexible geometry. However, the present invention may also be advantageously employed in so-called rigid geometry AEM systems, in which the geometry of the transmitter, bucking and receiver loops are nearly rigidly mounted with respect to one another, an examples of which is the Aerotem system. Such systems may experience drift, a component of which may be due to small geometrical variations, caused for example by small dimensional changes in the rigid supports. The effect of such changes may be diminished with the present invention by permitting the size of the bucked volume to be increased, and thus reducing the degree rigidity required Since the rigidity requirement in airborne systems limits the size of the system due to the weight of the rigid supports, the present invention may be advantageously employed in such rigid systems by either permitting the system to be lightened with less rigidity, so reducing the operating costs, or by extending the dimensions of the system, so improving the quality of the EM data.

ASPECTS OF THE CURRENT INVENTION

A first aspect the present invention refers to a bucked transmitter, namely a transmitter which has its magnetic field substantially annulled over a bucked volume. Bucking is done with a field created by multiple bucking loops belonging to a bucking loop arrangement, so the field may be annulled over a volume to a greater degree than can be accomplished with a single bucking loop.

The bucked transmitter comprises the bucking loop arrangement and a transmitter sending a known current waveform into a transmitter loop mounted on a substantially rigid framework. The bucking loop arrangement comprises a plurality of separate, electrically conducting bucking loops mounted on a bucking loop support, so that the bucking loops are held in place with respect to each other, and substantially in-place with respect to the transmitter loop. Currents that are energized in the bucking loops, with a current controller having a waveform substantially similar to the transmitter waveform, create a bucking magnetic field which substantially annuls the primary magnetic field over a bucked volume. In one variation, this current controller may refer to the transmitter, with the transmitter and bucking loops in series, while in other variations, the each loop may be driven by a separate current controller. In any variation, the bucking magnetic field is substantially in a direction opposite to, and is substantially equal in magnitude with, the primary magnetic field within the bucked volume, such that the bucking magnetic field substantially annuls said primary magnetic field over a larger volume than could be done with a single loop. The transmitter currents and the bucking currents may be sensed with current monitors, with the currents recorded using a data recording means, such as a data acquisition computer. The substantially rigid transmitter loop framework may permit small motions of the transmitter loop from its nominal location, but is sufficiently rigid that the bucked volume is not displaced by a significant distance in comparison to its dimensions.

In a second aspect of the invention, related to field of electromagnetic surveying, an electromagnetic measurement apparatus comprises a bucked transmitter, a magnetic field sensor, and a receiver adapted for controlling said magnetic field sensor so as to permit the output of said sensor to be measured and recorded. The magnetic field sensor is located in the bucked volume, and is mounted on a sensor support frame comprising a mechanical support apparatus adapted to support and limit the motion of the sensor to within the bucked volume. The sensor support frame and the bucking loop support are connected to the substantially rigid transmitter loop framework. The magnetic field within the bucked volume, comprising the primary and bucking magnetic fields, may also comprise a component that is scattered by the primary field due to induction in the Earth. As the magnetic field sensor operates in a volume where the primary field is bucked by the secondary field, it may be operated at a finer resolution than would be otherwise possible, and so may be adapted for measuring the component of the magnetic field which may be scattered from the Earth.

In a third aspect of the invention, a mobile electromagnetic measurement apparatus comprises an electromagnetic measurement apparatus and a carrier to transport it. The mobile electromagnetic measurement apparatus may also comprise a means of transporting the carrier, a sensor to detect the position and orientation of the carrier such as a global positioning system, and a means of recording data, such as a data acquisition computer. For example, variations of this aspect of the present invention may comprise electromagnetic prospecting systems.

In fourth aspect of the current invention, the invention may comprise part of an active airborne electromagnetic system, in which the transmitter loop may be adapted to energize eddy currents within the Earth, the magnetic field sensor may be adapted to measure those eddy currents, and the bucking loops may be adapted to cancel the primary field of the transmitter loop on the magnetic field sensor without appreciably affecting either the eddy current distribution in the Earth or the sensitivity of the magnetic field sensor to the eddy current distribution in the Earth.

In a fifth aspect of the invention, the aforementioned mobile electromagnetic measurement apparatus may adapted for towing beneath a helicopter to comprise part of an airborne electromagnetic prospecting system.

In another aspect of the current invention in which it is employed in an AEM system, the bucking loops may have the same orientation as, and lie coaxially with, the transmitter loop, but with a smaller radius. Each loop may lie in a different plane, axially offset from each other, as exemplified by a pseudo-Helmholtz bucking circuit arrangement, or within the same plane, as exemplified by the coplanar bucking circuit arrangements.

In another aspect of the current invention, by bucking the primary field of a transmitter loop over a larger volume than can a single bucking loop, the invention so reduces the sensitivity of the bucking to some deviations in loop geometry, and so provides a more robust solution to bucking the primary magnetic field of a transmitter antenna whose geometry may vary. Such variations may be common in AEM systems in which a flexible transmitter loop is employed. Provided the transmitter loop is substantially rigid, an aspect of the current invention permits the annulling the primary magnetic field over a larger volume and so may better accommodate variations in transmitter loop geometry than is provided by the current state of the art.

In another aspect of the current invention, the electrical connections between the bucking loops and between the bucking loops and the transmitter loop in the case of active bucking may be made by way of either a coaxial or a twisted bifilar cable so that the magnetic fields of the currents in these connections substantially cancel each other.

In another aspect of the invention, a plurality of sensors may be used to detect both the currents in the loops and the relative locations of the loops with respect to each other, permitting the geometry of the loops to be known in cases where the loops are not nearly rigid, or are not nearly rigidly affixed to one another, so as to permit the magnetic field, absent bucking to be computed. Such sensors may consist of Hall effect current monitors or equivalent detectors for detecting currents, and devices such as cameras, AHRS (attitude, heading and reference systems), differential positioning systems, laser rangers, radars, strain gauges and sensors of equivalent function which may be used to detect the relative changes in loop geometry. The primary and bucking magnetic fields may thus be computed in real time and the results recorded, or the aforementioned sensor data may be recorded, so as to permit the magnetic fields to be computed at a later time.

In all foregoing aspects of the current invention, the transmitting loop and bucking loop geometries, and the respective currents may be precisely measured and recorded so as to permit accurate computation of the corresponding magnetic fields so as to yield an improved separation of primary and scattered fields.

DESCRIPTION OF PREFERRED EMBODIMENTS OF THE CURRENT INVENTION

Figure 1:
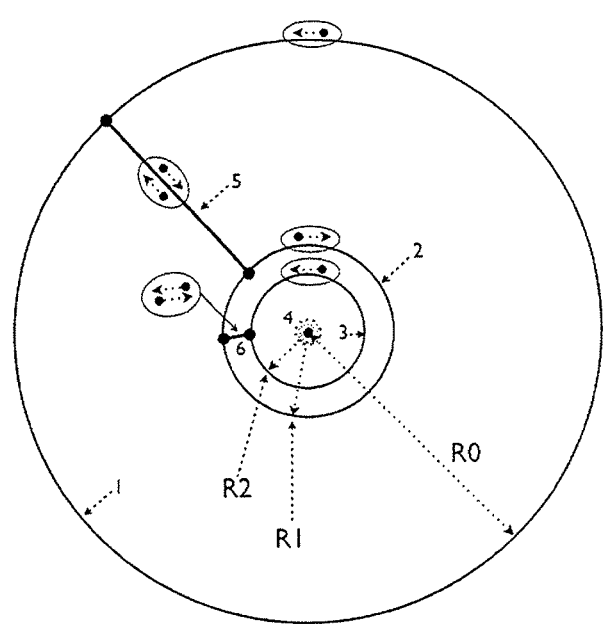
FIG. 1 illustrates aspects of a three-loop coplanar bucking configuration.

In the preferred embodiment of the present invention, the invention comprises a bucked transmitter mounted on a substantially rigid framework, with a transmitting electrical circuit comprising a substantially circular transmitter loop supported by said substantially rigid framework, a transmitter adapted to energize said transmitting circuit with a transmitting electric current having a known waveform so as to create a primary magnetic field, and a bucking loop assembly, comprising a bucking loop support to which the bucking loops are attached, and which is stably located with respect to geometrical aspects of the primary magnetic field. The bucking loop assembly is suitable for conducting a current that forms a bucking magnetic field which substantially annuls the primary magnetic field within a bucked volume. The primary magnetic field has a time variation substantially similar to the time variation of the transmitting electric current, with the geometrical aspects of the primary magnetic field being provided by the geometry of the transmitter loop. The conducting loops of the bucking loop assembly are energized with electric current to create a bucking magnetic field with known geometrical and time variation, wherein the bucking magnetic field is substantially in a direction opposite to, and is substantially equal in magnitude with, the primary magnetic field within the bucked volume. Accordingly, within the bucked volume, said bucking magnetic field substantially annuls the primary magnetic field.

The preferred embodiment comprises a substantially planar transmitter loop in which the bucking loop assembly is mounted in a coplanar configuration. Each loop in the bucking loop assembly is substantially coaxial with the transmitter loop such that the bucking loop axes are substantially aligned with the axis of the transmitter loop, with each bucking loop being smaller than the transmitter loop. The bucking loops are mounted to inhibit motion relative to the transmitter loop and the bucked volume. The bucked transmitter is configured with one electrical circuit comprising the transmitter and bucking loops in a series configuration. Connections between the transmitter and bucking loops are formed with coaxial or twisted bifilar conductors to suppress the magnetic fields of the current in the conductors connecting the loops.

In the preferred embodiment, the aforementioned bucked electromagnetic transmitter comprises part of a helicopter-borne electromagnetic surveying system. The bucked electromagnetic transmitter is mounted on a carrier towed below helicopter, The transmitter loop is substantially horizontal, and high-precision magnetometers, located in the bucked volume, are used to sample the magnetic field within the 1-10,000 Hz acquisition band. The magnetometers are mounted on a sensor support frame comprising a mechanical support apparatus adapted to support and limit the motion of the magnetic field sensor to the bucked volume of the bucked transmitter, such that sensor support frame is affixed to the transmitter loop framework of the bucked transmitter. A data acquisition system records the transmitter current, the sensed magnetic field, the attitude of the sensors, and the system geolocation as the helicopter towing the system traverses the Earth. The data acquisition system may also record variations in the relative geometry of the transmitter loop, bucking loops and the sensors. The geolocation system may comprise a means to record the position and altitude of the carrier with respect to the Earth's geographical coordinate system, such as a global position system (GPS) and an attitude, heading and reference system (AHRS).

The bucked volume in which the magnetic field sensor may move is defined by a locus of null points which lie approximately on the axis of the transmitter loop where the field is annulled. This locus extends bidirectionally from the plane of the transmitter loop to a nulling distance where the bucking field fails to substantially annul the primary field. The bucked volume has a scale length which is approximately governed by the length of the nulling axis, and which is approximately centered on the point where the axis of the transmitter loop and the plane of the transmitter intersect.

FIG. 1 illustrates a plan view of the bucked transmitter of the preferred embodiment, in which a three-loop coplanar configuration is used. In this embodiment, an outer, substantially circular conductive loop, 1, comprising of N0 turns of wire, where N0 may be 10, is wrapped in a substantially circular manner around a center point at a radius, R0, which may be 12.5 meters. A second substantially circular loop of wire, 2, comprising N1 turns, where N1 may be 4, is wound in the opposite sense to the outer loop 1, at a radius R1, which may be 3.0373 meters. A substantially circular inner loop, 3, comprising N2 turns, which may be 1 turn, is wound in the same direction as outer loop 1, at a radius R2 which may be 1.9344 meters. In FIG. 1, arrows surrounded by ellipses illustrate a possible selection of winding directions, and by implication, the direction of electric current flow. However, a person skilled in the art will understand all windings may be in the sense opposite to the ones shown with equal effect, by reversing the direction of the current, and will understand that the numbers of turns and radii of the bucking loops may be adapted to accommodate a different number of turns and radius of the transmitter loop.

In FIG. 1, zone 4 defines the location where the primary field of the transmitter loop 1 is substantially annulled by the bucking loops 2 and 3. The center point of zone 4 defines the reference point of the invention, and lies on the axes of the transmitter and bucking loops in the plane of the transmitter loop. A magnetic field sensor able to move within zone 4 may be used to acquire high-sensitivity magnetic measurements, while avoiding saturation from the large primary magnetic field and while also reducing variations in the recorded magnetic field resulting from large changes of the primary magnetic field in the bucked volume.

Again referring to FIG. 1, the primary field is created by currents in outer loop 1, which serves as the transmitter loop. Outer loop 1 is held in place relative to the bucking loops and the nulling zone in as rigid manner as possible, but due to its large radius, small deviations in the position of loop 1 are less important to the performance of the invention than are deviations in the locations of loops 2 and 3.

An electrical connection, 5, permits a series connection of loop 1 and bucking loop 2, and a second electrical connection, 6, permits the series connection of bucking loop 2 and bucking loop 3. Electrical connections 5 and 6 are disposed to minimize the magnetic field of the electrical currents they conduct, and may be formed from a twisted bifilar, coaxial or other equivalent structure where the external magnetic fields from oppositely flowing electrical currents are mutually cancelled. A person skilled in the art will understand that the order of the loops in the aforementioned series circuit may be altered with little effect on the invention where the transmitter current has a low time variation such that the circuit capacitances are unimportant.

Figure 2:
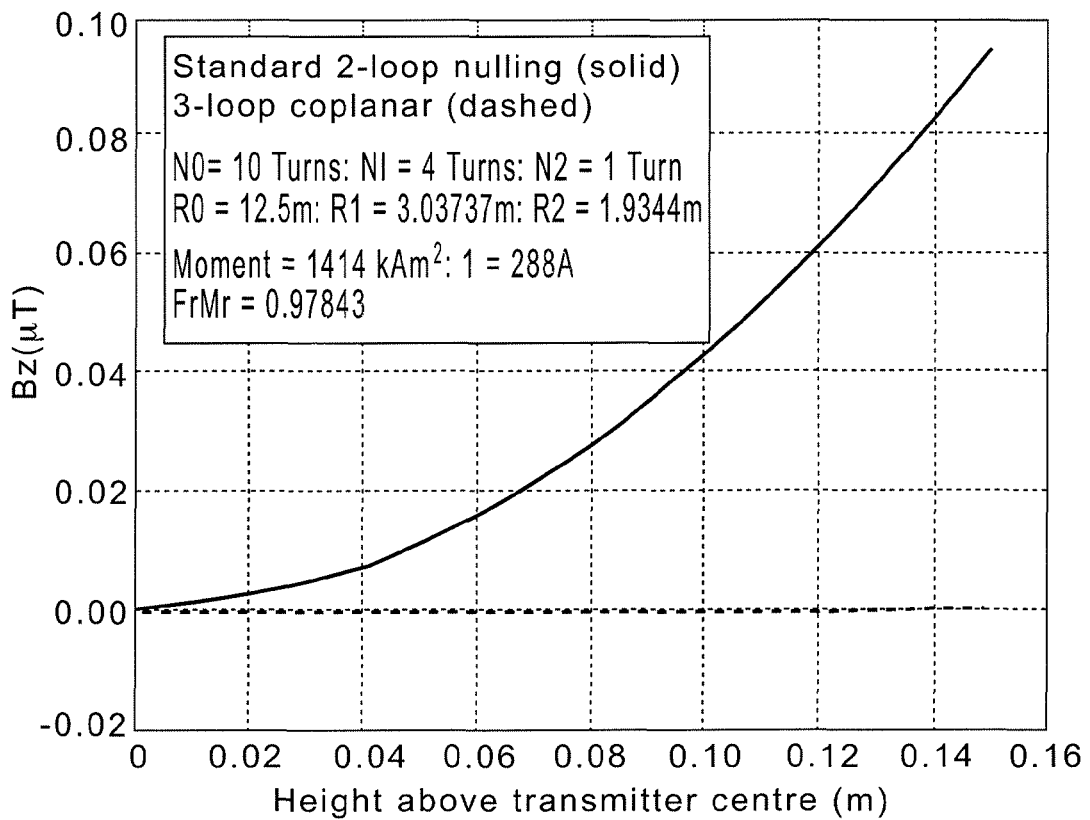
FIG. 2 illustrates a comparison between the bucking achieved by a three-loop coplanar bucking configuration and a two-loop coplanar bucking configuration over a range of 0.15 meters on the transmitter axis.

FIG. 2 illustrates a comparison the z-component of the magnetic field along the z-axis of rotational symmetry through the center of the loops of the preferred embodiment. A standard 2-loop coplanar nulling is compared to the aforementioned 3-loop case of the preferred embodiment for a 288 Amp current in the turns of the loops. In the preferred embodiment, the magnetic field is compensated to better than 1 part in 10,000 over a +/−0.15 meter range. The fractional reduction in the transmitter moment, indicated as FrMr, is negligible. In this example, R0=12.5 meters, R1=3.0733 meters, R2=1.9344 meters, N0=10, N1=4 and N2=1.

Figure 3:
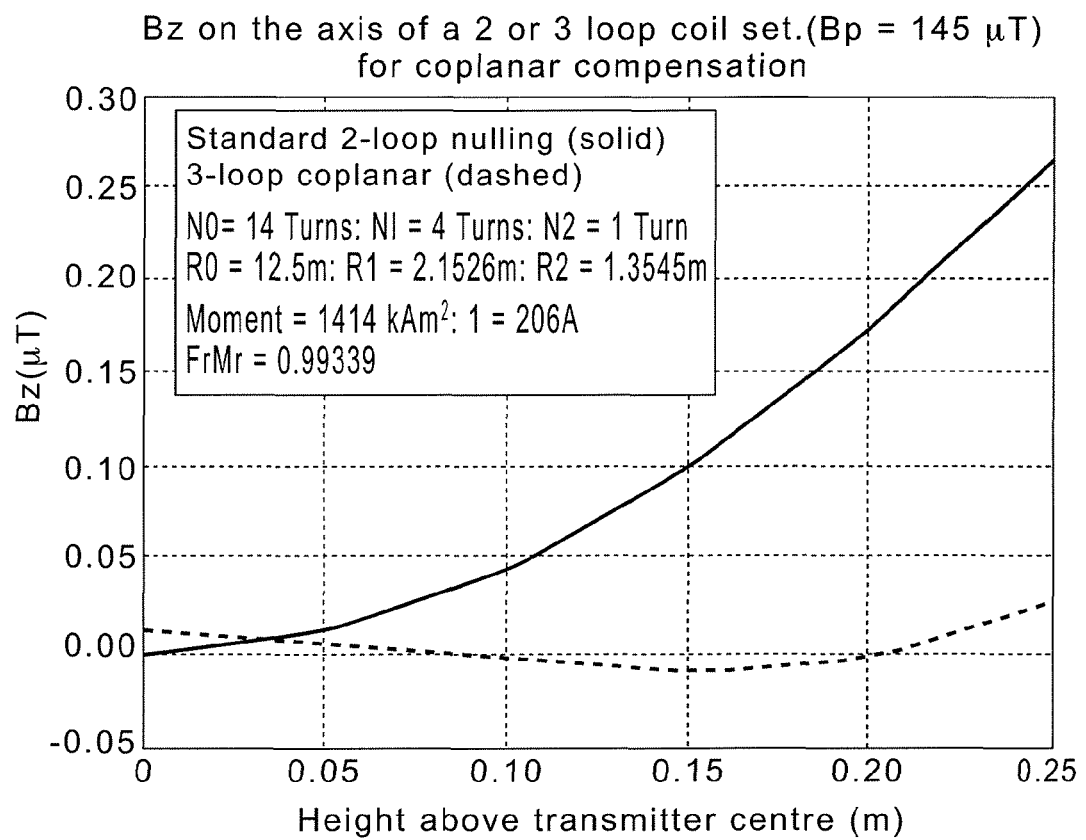
FIG. 3 illustrates a comparison between the bucking achieved by a three-loop coplanar bucking configuration and a two-loop coplanar bucking configuration over a range of 0.25 meters.

FIG. 3 illustrates the comparison the z-component of the magnetic field in another embodiment of a three-loop coplanar configuration. In this embodiment, the primary field of a 14-turn transmitter loop is nulled to 2 parts in 10,000 over a +/−0.25 meter range, R0=12.5 meters, R1=2.1526 meters, R2=1.3545 meters, N1=4 and N2=1.

Figure 4:
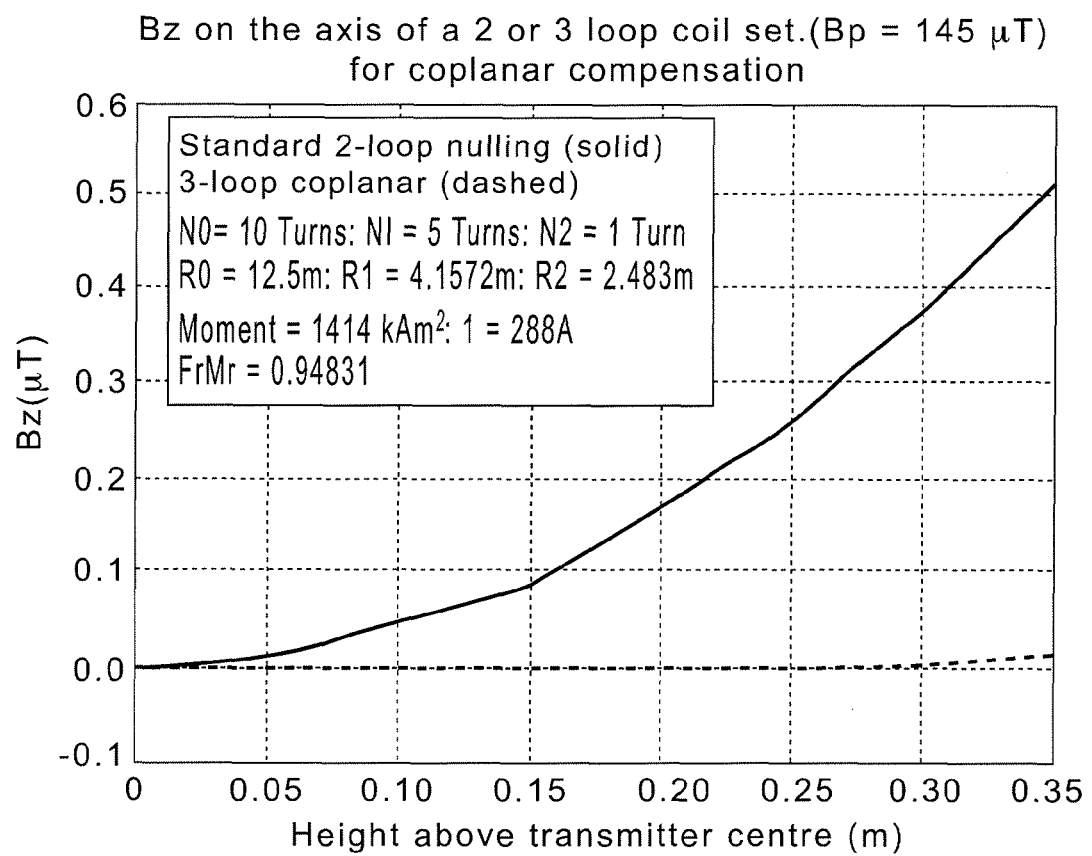
FIG. 4 illustrates a comparison between the bucking achieved by a three-loop coplanar bucking configuration and a two-loop coplanar bucking configuration over a range of 0.35 meters with larger loops.

FIG. 4 illustrates the comparison the z-component of the magnetic field in another embodiment of a three-loop coplanar configuration. In this embodiment, the primary field of a 10-turn transmitter loop is nulled to 2 parts in 10,000 over a +/−0.25 meter range, R0=12.5 meters, R1=4.1572 meters, R2=2.483 meters, N1=5 and N2=1. In this embodiment, larger diameter compensation loops are used.

Figure 5:
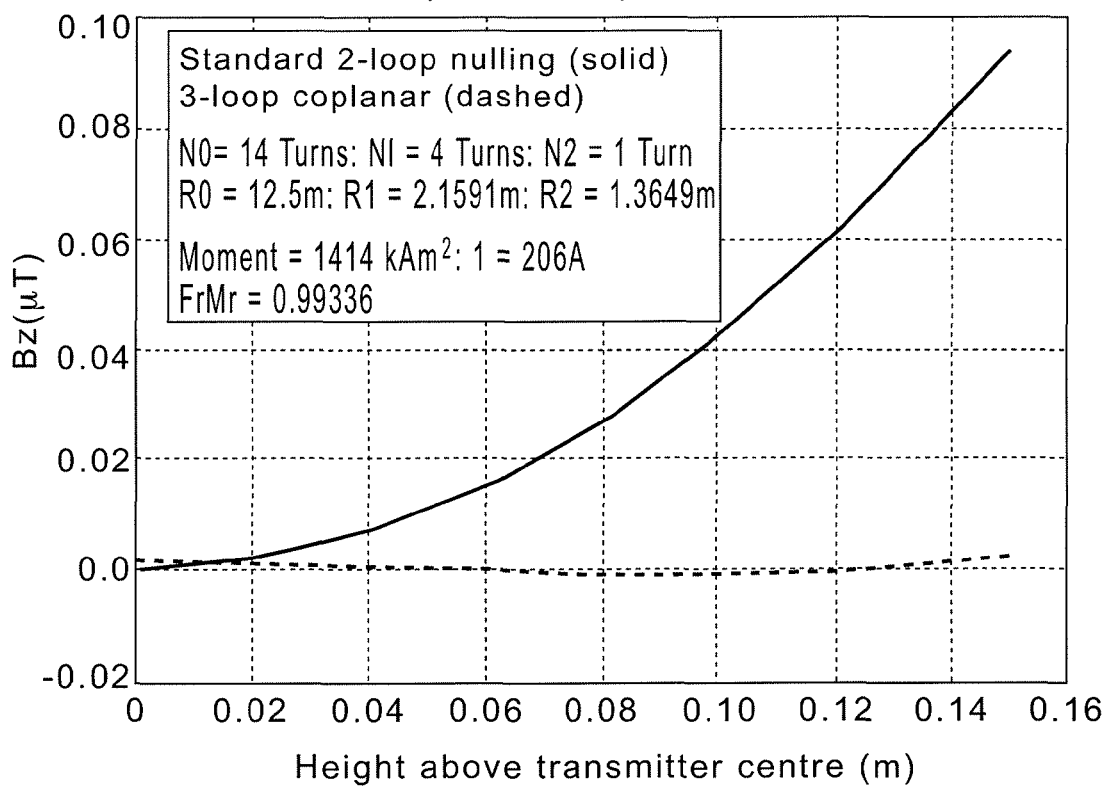
FIG. 5 illustrates a comparison between the bucking achieved by a three-loop coplanar bucking configuration and a two-loop coplanar bucking configuration over a range of 0.15 meters with smaller loops.

FIG. 5 illustrates the comparison the z-component of the magnetic field in another embodiment of a three-loop coplanar configuration. In this embodiment, the primary field of a 14-turn transmitter loop is nulled over a +/−0.15 meter range, R0=12.5 meters, R1=2.1591 meters, R2=1.3649 meters, N1=4 and N2=1. In this embodiment, smaller diameter bucking loops are employed, resulting in a smaller volume of accurate nulling.

Figure 6:
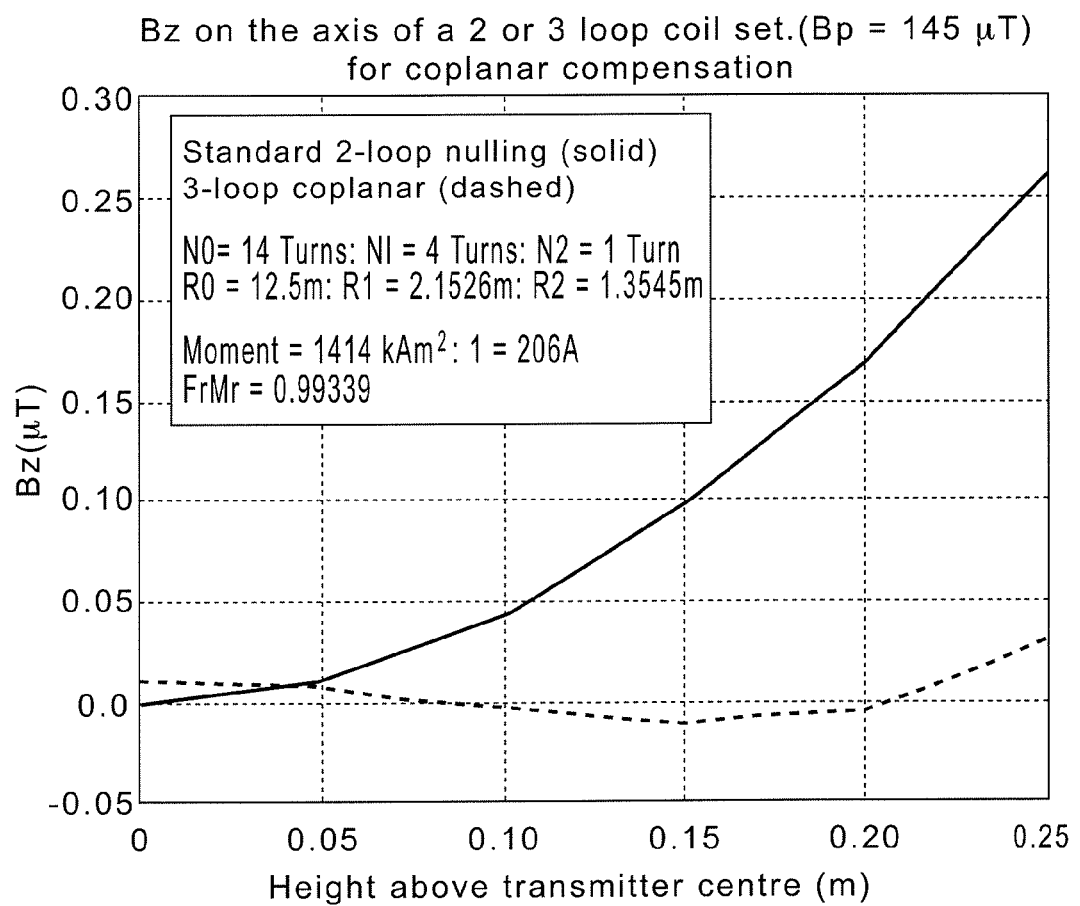
FIG. 6 illustrates a comparison between the bucking achieved by a three-loop coplanar bucking configuration and a two-loop coplanar bucking configuration over a range of 0.25 meters.

FIG. 6 illustrates the comparison the z-component of the magnetic field in another embodiment of a three-loop coplanar configuration. In this embodiment, the primary field of a 14-turn transmitter loop is nulled with R0=12.5 meters, R1=2.1526 meters, R2=1.3545 meters, N1=4 and N2=1. This embodiment permits a wider range of nulling along the z-axis of the loop system, and by implication, radially as well.

Figure 7:
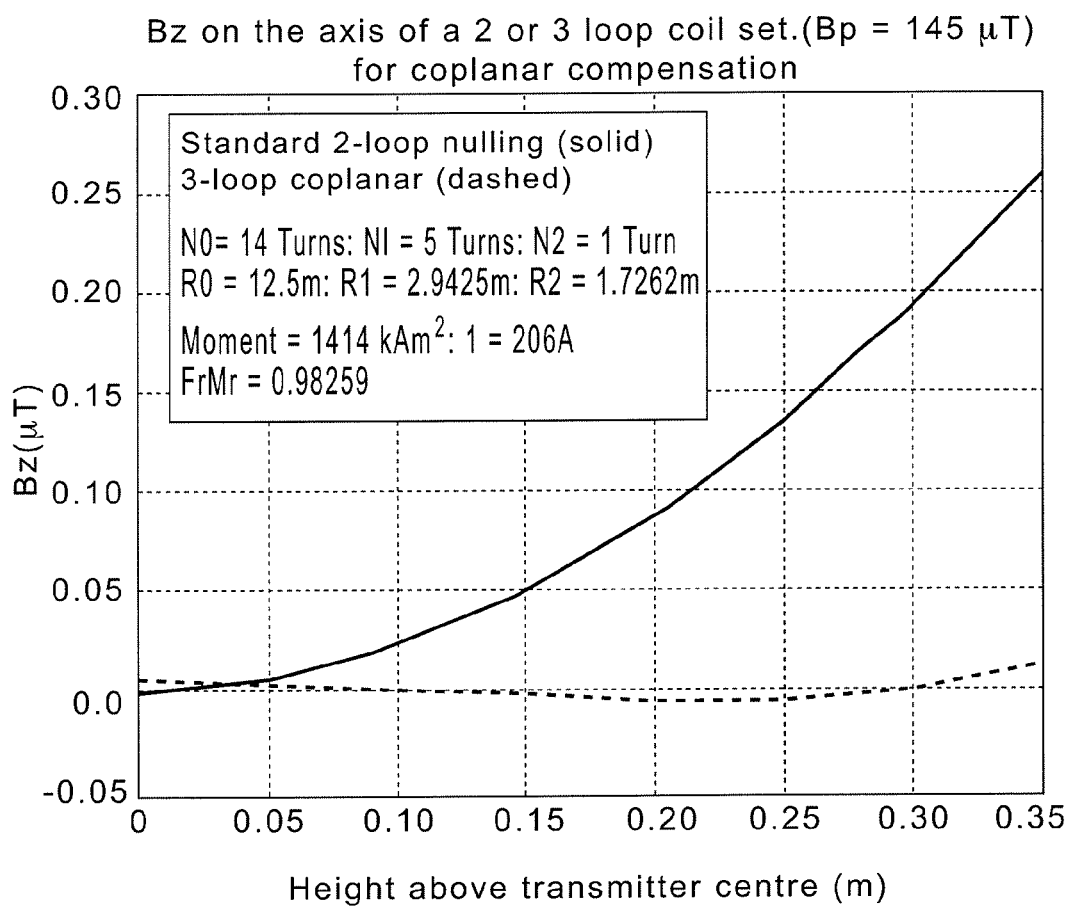
FIG. 7 illustrates a comparison between the bucking achieved by a three-loop coplanar bucking configuration and a two-loop coplanar bucking configuration over a range of 0.35 meters with larger loops.

FIG. 7 illustrates the comparison the z-component of the magnetic field in another embodiment of a three-loop coplanar configuration. In this embodiment, the primary field of a 14-turn transmitter loop is nulled with R0=12.5 meters, R1=2.9425 meters, R2=1.7262 meters, N1=5 and N2=1. In this embodiment, the bucking loops are enlarged to give a larger region of accurate compensation.

While the foregoing examples demonstrate various embodiments possible with coplanar bucking loops, these examples are meant to be illustrative of possible embodiments of the present invention, and not to be interpreted to limit the scope of the invention, for example, to the number of loops, numbers of turns, or number of radii provided in those examples. For example, embodiments of the present invention may comprise a bucking loop assembly formed in the pseudo-Helmholtz configuration, as illustrated below.

Figure 8:
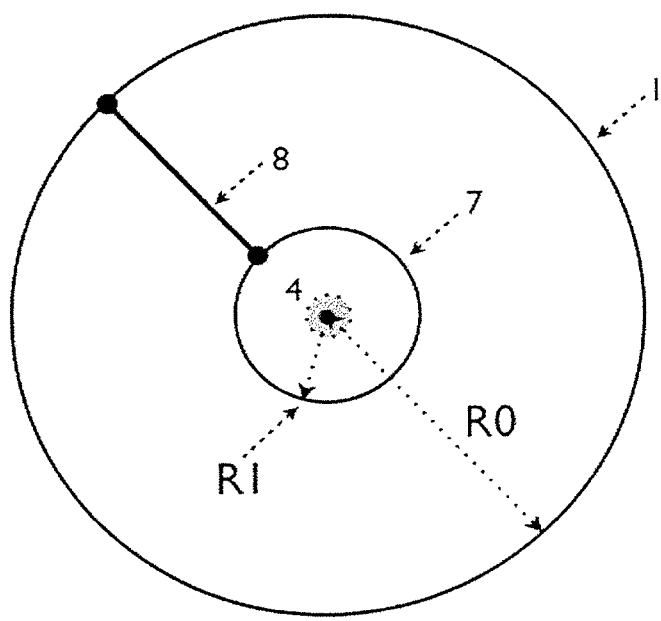
FIG. 8 illustrates aspects of a pseudo-Helmholtz configuration in plan.
Figure 9:
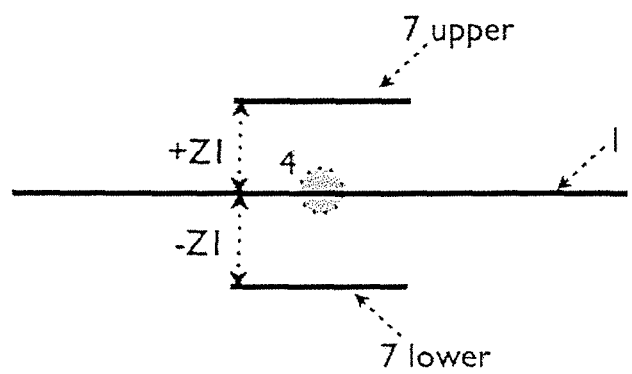
FIG. 9 illustrates aspects of a pseudo-Helmholtz configuration in section.

FIG. 8 illustrates the plan view of a pseudo-Helmholtz embodiment of the current invention which is implemented with a single pair of bucking loops in the active mode. Transmitter loop 1 creates a primary field which is bucked in volume 4 by the pair of bucking loops 7. The sense of the current in the bucking loops is opposite to that in the transmitter loop. Transmitter loop 1 is substantially circular with a radius denoted R0, while the bucking loops are coaxial with the transmitter loop with radius denoted R1, but offset from the plane of the transmitter loop by distances +/−Z1 parallel to the z-axis of symmetry of the transmitter loop, as illustrated in FIG. 9. Loops 1 and 7 are connected by electrical cable 8 to carry current between the transmitter and bucking loops. Electrical cable 8 may drive both bucking loops in parallel, or in series from one loop to the other. Electrical cable 8 is fashioned in a such manner as to create a minimal magnetic field, such as may be obtained using a coaxial, twisted bifilar or other geometry with similar effect.

As in the case of the preferred embodiment, zone 4 defines the location where the primary field of the transmitter loop 1 is substantially annulled by the bucking loops 7. The center point of zone 4 defines the reference point of the invention. A magnetic field sensor able to move within zone 4, may be used to acquire high-sensitivity magnetic measurements, while avoiding saturation from the large primary magnetic field and while also avoiding significant changes in the recorded magnetic field resulting from variations of the primary magnetic field in the bucked volume.

Again referring to FIG. 9, the primary field is created by current in outer loop 1, which serves as the transmitter loop. Outer loop 1 is held in place relative to the bucking loops and the nulling zone in as rigid manner as possible, but due to its large radius, small deviations in the position of loop 1 are less important to the performance of the invention than are deviations in the locations of loops 7.

Figure 10:
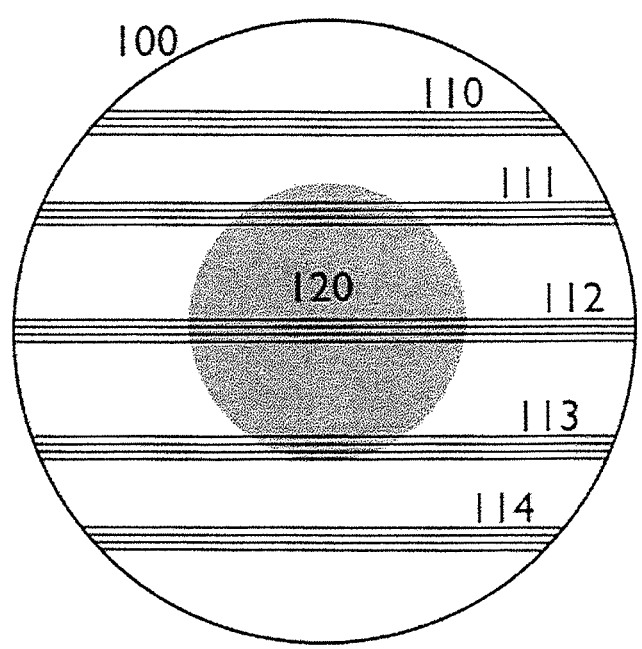
FIG. 10 illustrates aspects of a bucking loops mounted on a sphere
Figure 11:
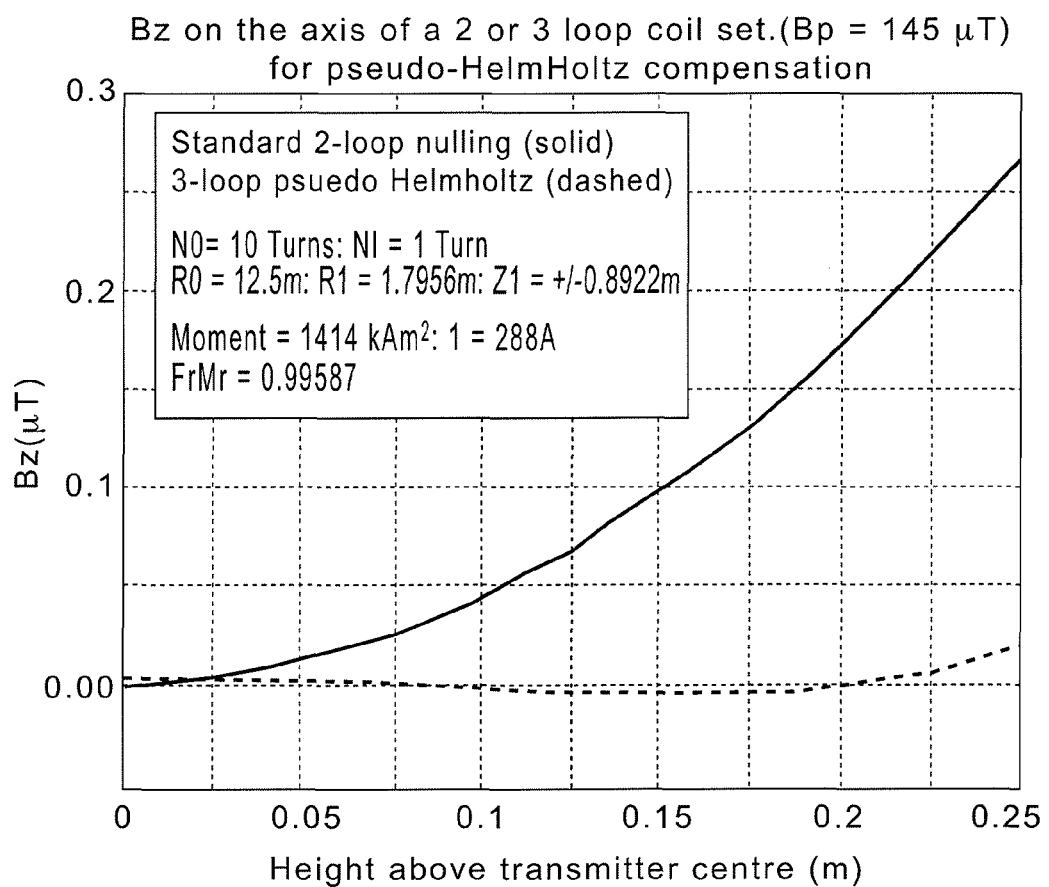
FIG. 11 illustrates a comparison between the bucking achieved by a three-loop pseudo-Helmholtz bucking configuration and a two-loop coplanar bucking configuration over a range of 0.25 meters.

FIG. 10 illustrates, in section view, a bucking loop configuration implemented with coaxial loops having differing radii. In this example, pairs of Helmholtz loops (for example 110 and 114), together with a single coplanar bucking loop 112, are wound on a spherical shell 100. The multiple bucking loops, 110 . . . 114 are arranged to annul the component of the primary field in region 120 parallel to the axes of the loops using means analogous to the pseudo-Helmholtz style illustrated in FIGS. 8 and 9. In this embodiment of the invention, a plurality of loops may be employed to substantially buck the primary field in region 120 which may be larger than the bucked volume achieved with fewer bucking loops FIG. 11 illustrates the effect which may be obtained from an embodiment of the invention using pseudo-Helmholtz bucking. This embodiment is implemented with two bucking loops as illustrated in FIGS. 8 and 9. The transmitter loop is substantially circular with a radius of 12.5 meters and 10 turns. Each bucking loop is substantially circular and wound with one turn with a radius of 1.7956 meters, and offset from the plane of the transmitter loop by 0.8922 meters. In this embodiment of the current invention, the primary field is annulled to better than 1 part in 10,000 over +/−0.25 meters.

Figure 12:
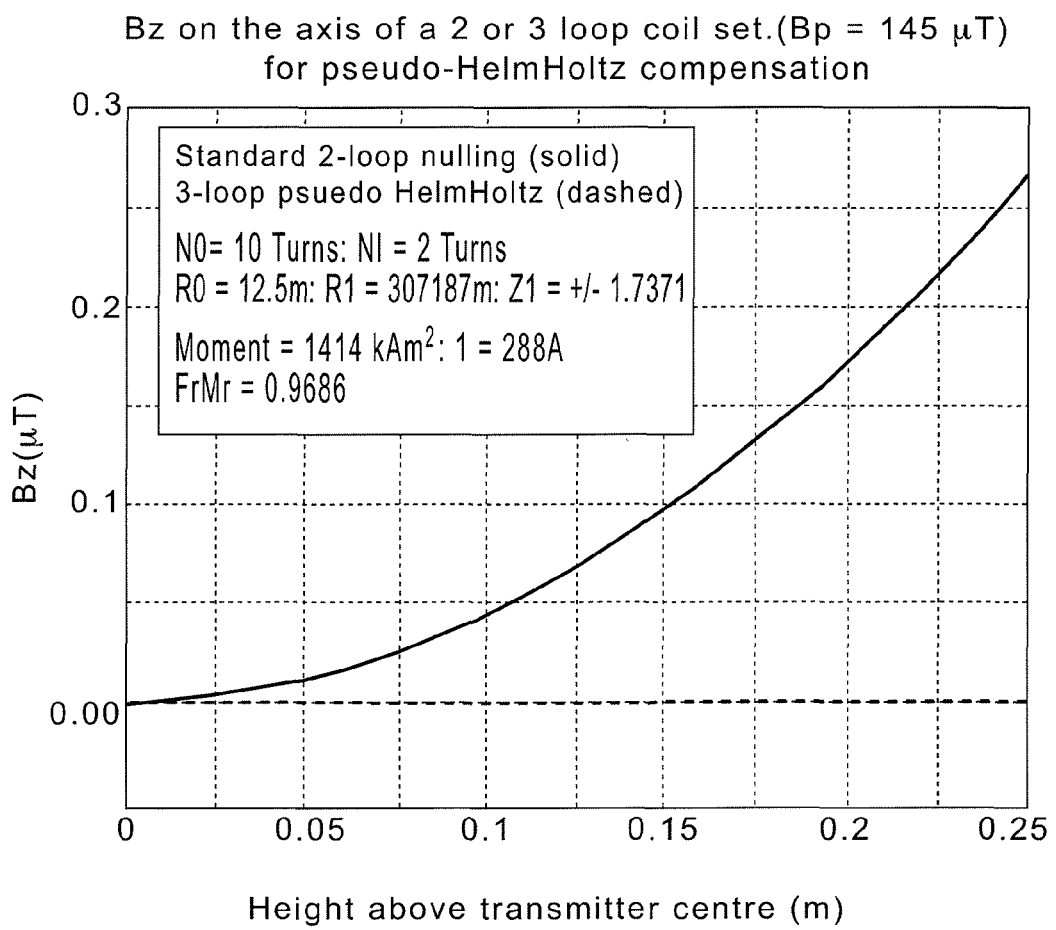
FIG. 12 illustrates a comparison plot between a three-loop pseudo-Helmholtz bucking configuration and a two-loop coplanar bucking configuration over a range of 0.25 meters with larger loops.

FIG. 12 illustrates the effect which may be obtained from a pseudo-Helmholtz embodiment where the transmitter loop is substantially circular with a radius of 12.5 meters and 10 turns. Each bucking loop is substantially circular and wound with two turns having a radius of 3.7187 meters, and offset from the plane of the transmitter loop by 1.7371 meters. In this embodiment of the current invention, the primary field is annulled over a larger volume than in the previous case, due to the larger bucking loop set employed.

Figure 13:
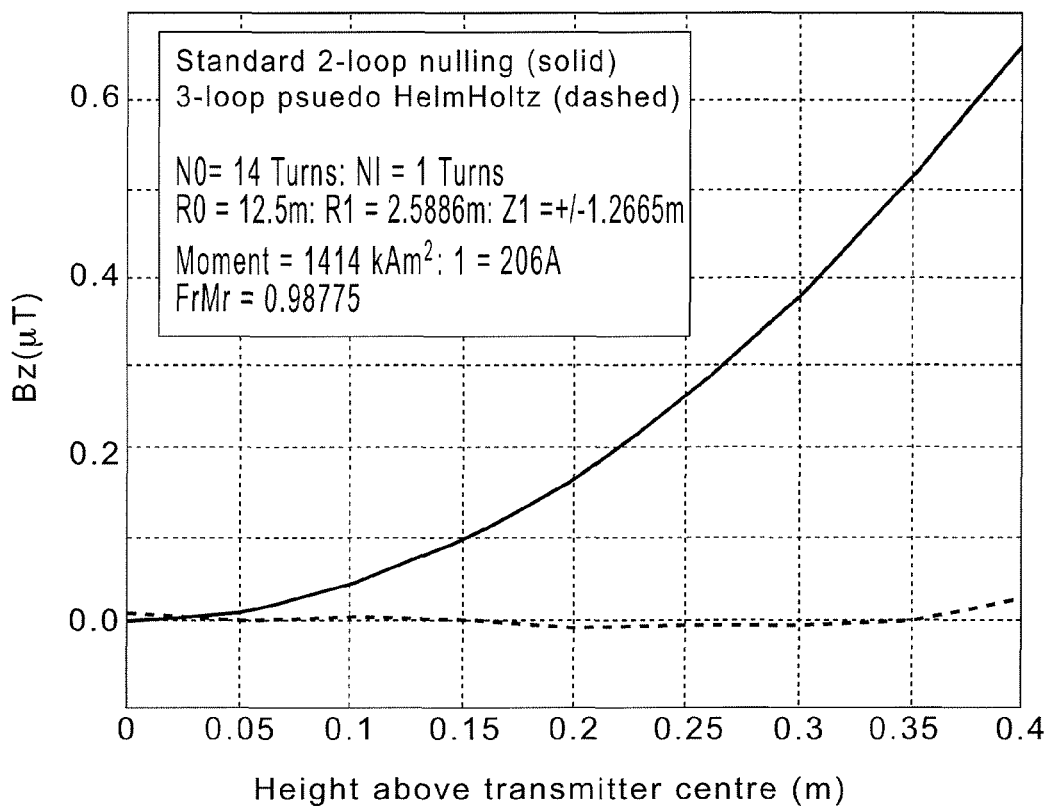
FIG. 13 illustrates a comparison between the bucking achieved by a three-loop pseudo-Helmholtz bucking configuration and a two-loop coplanar bucking configuration over a range of 0.4 meters.

FIG. 13 also shows the effect which may be obtained from another pseudo-Helmholtz embodiment of the current invention where the transmitter loop is substantially circular with a radius of 12.5 meters and 14 turns. In this embodiment, substantial bucking is obtained over a distance of 0.4 meters on the z-axis. Each bucking loop is wound with 2 turns on a radius of 2.5886 meters and a z-offset of 1.2665 meters.

Figure 14:
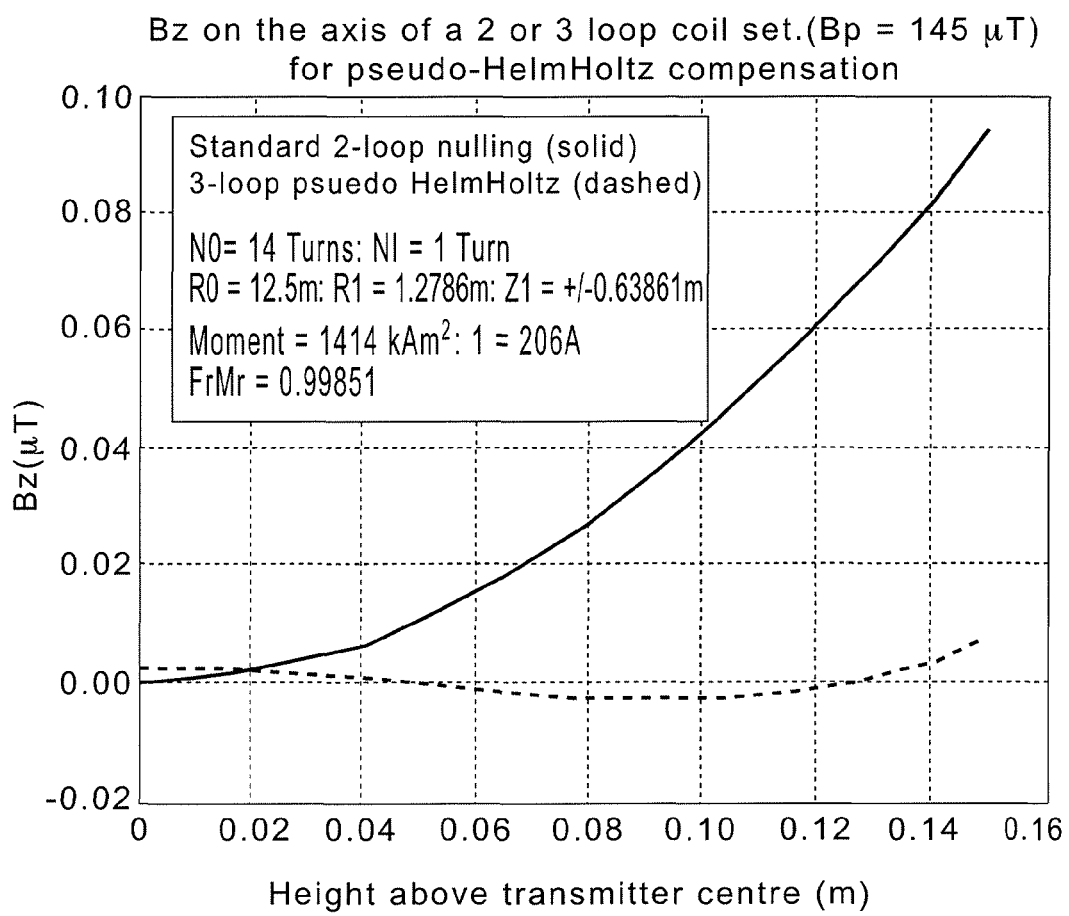
FIG. 14 illustrates a comparison between the bucking achieved by a three-loop pseudo-Helmholtz bucking configuration and a two-loop coplanar bucking configuration over a range of 0.15 meters with smaller loops.

FIG. 14 also illustrates the effect which may be obtained from another pseudo-Helmholtz embodiment where the transmitter loop is substantially circular with a radius of 12.5 meters and 14 turns. In this case, a compact pseudo-Helmholtz loop set is used to achieve excellent cancellation of the primary field over a distance of +/−0.15 meters on the z-axis. In this embodiment of the current invention, the bucking loops each have one turn, and are wound on a radius of 1.2786 meters with a z-offset of +/−0.63861 meters.

While the forgoing examples of embodiments of the current invention, illustrate the effect of bucking with a 2-loop bucking loop assembly, these examples are meant to demonstrate possible embodiments the current invention, and are not meant to imply a restriction on the numbers of loops employed, their offsets, numbers of turns or their radii. Some embodiments of the current invention may employ, by way of example, combinations of coplanar and pseudo-Helmholtz configurations, combinations of coplanar configurations, some of which may be offset from the plane of the transmitter loop, or combinations of pseudo-Helmholtz loops offset at different radii.

Other embodiments of the current invention may employ the aforementioned combinations of pseudo-Helmholtz bucking loops by rigidly attaching them to the same structure as supports the sensor.

In other embodiments of the current invention, the bucked volume may be offset from the plane or from the axis of the transmitter loop by so arranging the bucking loops to substantially annul the primary magnetic field in a volume that is displaced either from the plane of the transmitter loop, its axis, or in general at any point in space. Such an embodiment may be useful in AEM surveying to bucking the primary in the vicinity of a magnetic field sensor mounted on a tow cable and which is accordingly offset from the axis of symmetry of a towed transmitter. In such embodiments, the turns and diameters of the bucking coils will have to be chosen to cancel the gradient of the primary field in the bucking volume.

Figure 15:
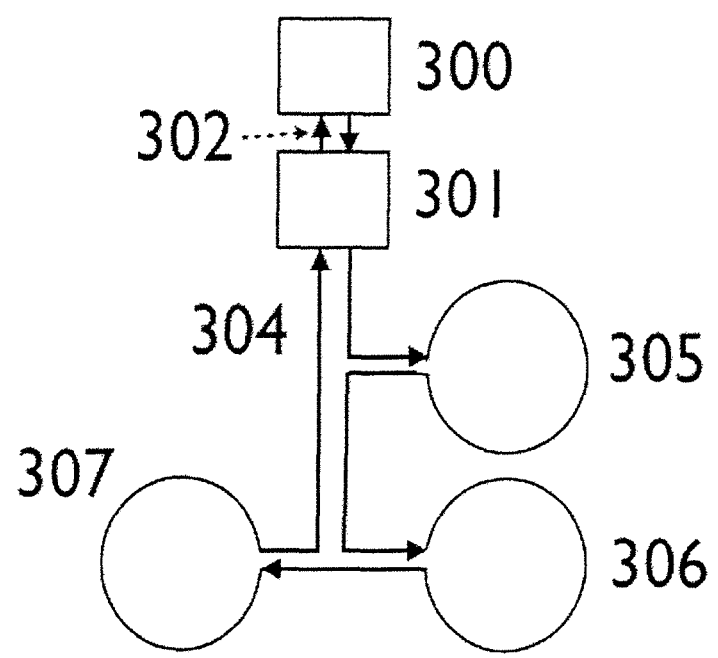
FIG. 15 illustrates aspects of an electrical circuit for driving of a 3-loop bucking configuration.

FIG. 15 illustrates various aspects of the electric circuits in an embodiment of the current invention comprising an active source electromagnetic system. Power supply 300 energizes transmitter 301 through electrical cable 302. Transmitter 301 forms a current waveform which is output on electrical cable 304 to form a series circuit with transmitter loop 305, first bucking loop 306 and second bucking loop 307. Sections of electrical cable 304 may comprise coaxial, twisted bifilar or any such conductor geometry so as to suppress magnetic fields from the bidirectional current flowing within, as noted in aforementioned example embodiments.

Figure 16:
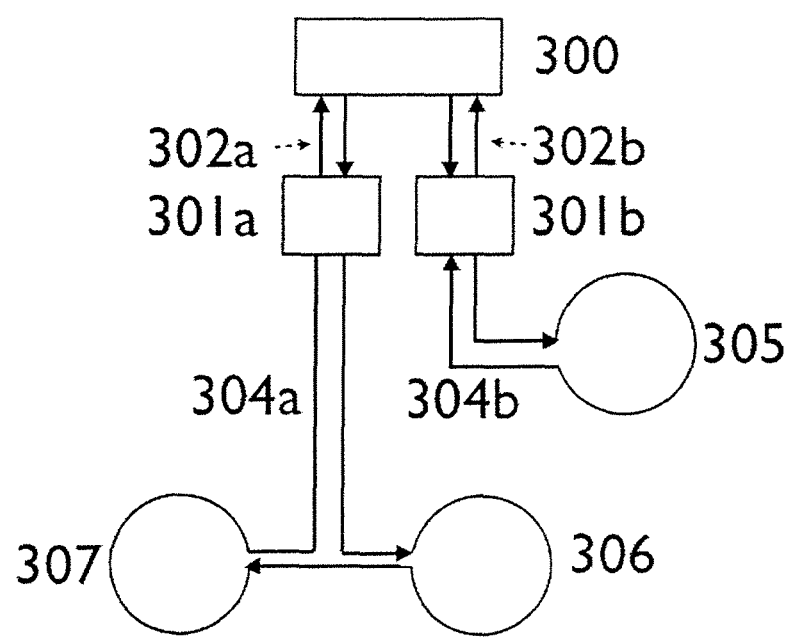
FIG. 16 illustrates aspects of another electrical circuit for driving of a 3-loop bucking configuration.

FIG. 16 illustrates alternative aspects of the electric circuits in an embodiment of the current invention, for the cases when it is implemented as part of an active source electromagnetic system. In FIG. 16, the bucking loops are in a separate circuit 304*a* from circuit 304*b* which contains the transmitter loop 305. Each circuit is driven by separate current controller 301*a*, and 301*b*, of which 301*b* comprises the transmitter, with each controller energized by currents on their respective supply cables, 302*a* and 302*b*. Both controllers provide identical current waveforms to their respective loops.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art.

Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A bucked transmitter, comprising:
a transmitting electrical circuit comprising a transmitter loop;
a transmitter loop framework to support the transmitter loop, the transmitter loop framework being substantially rigid;
a transmitter adapted to energize the transmitting electrical circuit with a transmitting electric current having a known waveform so as to form a primary magnetic field;
a plurality of radially separated, substantially planar bucking loops, each bucking loop being dimensionally smaller than the transmitter loop and each bucking loop having a distinct radius less than that of the transmitter loop, arranged coaxially along an axis substantially parallel to a local direction of the primary magnetic field and energized with current by a current controller;
a substantially rigid support to which each of the bucking loops is affixed, the support being attached to the transmitter loop framework, wherein the bucking loops are stably located with respect to geometrical aspects of the primary magnetic field;

a nulling axis which extends bi-directionally in a perpendicular direction from a plane parallel to the bucking loops to a termination point at each end of the nulling axis;

wherein a bucking magnetic field is formed within a bucked volume by current in the bucking loops, the bucked volume being substantially centered on the nulling axis, a plurality of the termination points are located where the bucking magnetic field fails to substantially annul the primary magnetic field, and the bucking magnetic field is substantially in a direction opposite to, and is substantially equal in magnitude with, the primary magnetic field, such that the bucking magnetic field substantially annuls the primary magnetic field within the bucked volume.

2. The bucked transmitter according to claim 1, wherein the plurality bucking loops comprise a first bucking loop and a second bucking loop, the first and second bucking loops being substantially circular.

3. The bucked transmitter according to claim 2, wherein the first bucking loop and the second bucking loop are arranged in a common plane, the first bucking loop being geometrically smaller than the second bucking loop.

4. The bucked transmitter according to claim 3, wherein the common plane comprises the plane of the transmitter loop, the magnetic moments of the first bucking loop and the transmitter loop are substantially parallel in the same direction, and the magnetic moments of the second bucking loop and the transmitter loop are substantially opposed.

5. The bucked transmitter according to claim 2, wherein the first and second bucking loops are each disposed with the same effective radius, number of turns and with magnetic moments in the same direction, wherein each of the bucking loops is offset from the transmitter plane in the direction of the common axis.

6. The bucked transmitter according to claim 5, wherein the bucking loops are coaxial with the transmitter loop, the first and second bucking loops being offset from the plane of the transmitter loop by equal distances and in opposite directions, and wherein the magnetic moments of the first bucking loop, the second bucking loop are substantially in parallel and are opposed to the magnetic moment of the transmitter loop.

7. The bucked transmitter of claim 1, wherein the electrical connections supplying electrical current to the bucking loops are selected from the group consisting of: bifilar wires, coaxial wires and combinations thereof.

8. The bucked transmitter of claim 1, wherein the transmitter loop and the bucking loops are disposed to form a series electrical circuit, whereby the current controller for the bucking loops is the transmitter.

9. The bucked transmitter of claim 1, wherein each of the plurality of bucking loops and the current controller form a first electrical circuit and the transmitter loop and the transmitter form a second electrical circuit.

10. The bucked transmitter of claim 1, further comprising a current sensor and data recorder, wherein the current in the transmitter loop is measured and recorded.

11. The bucked transmitter of claim 1, further comprising a current sensor and data recorder, wherein the current in each of the plurality of bucking loops is measured and recorded.

12. The bucked transmitter according to claim 1, further comprising a sensing means responding to the geometry of the bucking loops and a data recorder, wherein the sensing means is disposed to respond to the shape and positions of the bucking loops, and the data recorder records data output by the sensing means.

13. An electromagnetic measurement apparatus, comprising:

a bucked transmitter, comprising:

a transmitting electrical circuit comprising a transmitter loop;

a transmitter loop framework to support the transmitter loop, the transmitter loop framework being substantially rigid;

a transmitter adapted to energize the transmitting electrical circuit with a transmitting electric current having a known waveform so as to form a primary magnetic field;

a plurality of radially separated, substantially planar bucking loops, each bucking loop being dimensionally smaller than the transmitter loop and each bucking loop having a distinct radius less than that of the transmitter loop, arranged coaxially along an axis substantially parallel to a local direction of the primary magnetic field and energized with current by a current controller;

a substantially rigid support to which each of the bucking loops is affixed, the support being attached to the transmitter loop framework, wherein the bucking loops are stably located with respect to geometrical aspects of the primary magnetic field;

a nulling axis which extends bi-directionally in a perpendicular direction from a plane parallel to the bucking loops to a termination point at each end of the nulling axis;

wherein a bucking magnetic field is formed within a bucked volume by current in the bucking loops, the bucked volume being substantially centered on the nulling axis, a plurality of termination points are located where the bucking magnetic field fails to substantially annul the primary magnetic field, and the bucking magnetic field is substantially in a direction opposite to, and is substantially equal in magnitude with, the primary magnetic field, such that the bucking magnetic field substantially annuls the primary magnetic field within the bucked volume;

a magnetic field sensor;

a receiver adapted to controlling the magnetic field sensor so as to permit the output of the sensor to be measured and recorded;

a data recorder disposed to record data from the receiver;

a sensor support frame comprising a mechanical support apparatus adapted to support and limit the motion of the magnetic field sensor to the bucked volume of the bucked transmitter, whereby the sensor support frame is affixed to the transmitter loop framework of the bucked transmitter; and wherein the location of the bucked volume is substantially fixed relative to the mechanical support apparatus.

14. The electromagnetic measurement apparatus of claim 13, further comprising means to measure the geometry of the magnetic field sensor with respect to the transmitter loop and the bucking loops, whereby the geometrical data are recorded so as to permit a calculation of the magnetic field absent bucking, the primary magnetic field, the bucking magnetic field, and combinations thereof, at the magnetic field sensor.

15. The electromagnetic measurement apparatus of claim 13, further comprising:

a carrier to transport the electromagnetic measurement apparatus;
a means of transporting the carrier;
a sensor to detect the position of the carrier; and
a means of recording the positions.

16. The electromagnetic measurement apparatus of claim 13, wherein the means of transporting the carrier is selected from the group consisting of aircraft, airships, dirigibles, helicopters, towed birds, ground vehicles, towed trailers, barges, ships, boats, submersible vehicles and combinations thereof.

17. The electromagnetic measurement apparatus of claim 13, wherein the electromagnetic measurement apparatus is adapted for helicopter borne geophysical surveying, and is suspended on a tow cable below a helicopter and a plane of the transmitter loop is substantially horizontal.

18. The electromagnetic measurement apparatus of claim 13, further comprising an orientation sensor operable to measure and record an orientation of the magnetic field sensor.

19. The electromagnetic measurement apparatus of claim 13, further comprising an orientation sensor operable to measure and record an orientation of the transmitter loop.

* * * * *